(12) United States Patent
Rydström

(10) Patent No.: US 11,798,422 B2
(45) Date of Patent: Oct. 24, 2023

(54) SITUATION AVOIDANCE SYSTEMS FOR MARINE VESSELS

(71) Applicant: Volvo Penta Corporation, Gothenburg (SE)

(72) Inventor: Mats Rydström, Billdal (SE)

(73) Assignee: Volvo Penta Corporation, Gothenburg (SE)

( * ) Notice: Subject to any disclaimer, the term of this patent is extended or adjusted under 35 U.S.C. 154(b) by 185 days.

(21) Appl. No.: 17/398,711

(22) Filed: Aug. 10, 2021

(65) Prior Publication Data

US 2022/0058957 A1 Feb. 24, 2022

(30) Foreign Application Priority Data

Aug. 20, 2020 (EP) .................................... 20191923

(51) Int. Cl.
| | |
|---|---|
| *G08G 3/02* | (2006.01) |
| *B63B 49/00* | (2006.01) |
| *B63C 9/00* | (2006.01) |
| *G01C 21/20* | (2006.01) |
| *G05D 1/02* | (2020.01) |

(Continued)

(52) U.S. Cl.
CPC ............... *G08G 3/02* (2013.01); *B63B 49/00* (2013.01); *B63C 9/0011* (2013.01); *G01C 21/203* (2013.01); *G01W 1/02* (2013.01); *G05D 1/0208* (2013.01); *B63B 2035/008* (2013.01); *B63B 2213/02* (2013.01); *B63C 2009/0017* (2013.01)

(58) Field of Classification Search
CPC .... G08G 3/02; B63B 49/00; B63B 2035/008; B63B 2213/02; B63B 2035/007; B63C 9/0011; B63C 2009/0017; G01C 21/203; G01W 1/02; G05D 1/0208; G05D 1/0206
See application file for complete search history.

(56) References Cited

U.S. PATENT DOCUMENTS 8,998,666 B1 * 4/2015 Albright .................... B63C 9/20
340/573.6
2005/0268834 A1 12/2005 Koda et al.
2018/0057132 A1 3/2018 Ward et al.
(Continued)

FOREIGN PATENT DOCUMENTS

CN 109002036 A 12/2018
WO 2015164863 A1 10/2015

OTHER PUBLICATIONS

Extended European Search Report for European Patent Application No. 20191923.0, dated Feb. 25, 2021, 7 pages.

*Primary Examiner* — Brian P Sweeney
(74) *Attorney, Agent, or Firm* — Withrow & Terranova, PLLC

(57) ABSTRACT

A control unit for controlling a marine vessel to avoid an emergency situation, the control unit comprising processing circuitry and a storage medium, wherein the control unit is configured to receive path data from one or more sensor devices indicative of a path traveled by the marine vessel in a forward direction and to store the received path data by the storage medium, characterized in that the control unit is configured to receive a trigger signal from an input device, and, in response to the trigger signal, determine a location for turning the vessel around, navigating to the location, turning the vessel around at the location, and navigating the vessel along the path in reverse direction.

18 Claims, 3 Drawing Sheets

(51) Int. Cl.
*G01W 1/02* (2006.01)
*B63B 35/00* (2020.01)

(56) References Cited

U.S. PATENT DOCUMENTS

| | | |
|---|---|---|
| 2019/0135400 A1* | 5/2019 | Pietola .................. B63H 25/04 |
| 2019/0204086 A1 | 7/2019 | Kikuchi |
| 2020/0012283 A1 | 1/2020 | Nguyen |

* cited by examiner

SITUATION AVOIDANCE SYSTEMS FOR MARINE VESSELS

RELATED APPLICATIONS

The present application claims priority to European Patent Application No. 20193854.5, filed on Sep. 1, 2020, and entitled "SITUATION AVOIDANCE SYSTEMS FOR MARINE VESSELS," which is incorporated herein by reference in its entirety.

TECHNICAL FIELD

The present disclosure relates to marine vessels and, in particular, to automated systems for control of such vessels. There are disclosed systems, control units, and methods for autonomously navigating a marine vessel away from an undesired situation.

BACKGROUND

Boating can be challenging at times. Quickly changing weather conditions and other unexpected circumstances may require a helmsman and/or person in charge of navigation of a marine vessel to abandon an ongoing maneuver and quickly develop a new plan.

For instance, when entering a natural harbor, many things can happen which necessitate aborting the maneuver. For example, the harbor can be unexpectedly crowded with boats, and/or something on the boat may break at the wrong time. Maneuvering in such scenarios may be challenging due to limited maneuvering space.

Accidents, such as man-over-board events, may also occur, which require a fast response to the event and sometimes relatively complicated maneuvering of the vessel.

Some support systems for assisting in boat maneuvering and navigation are known. In particular, there is disclosed an automated tender function that navigates a vessel to and from a pier without anyone on board.

There is a continuing need for improved systems that promote easy boating.

SUMMARY

It is an object of the present disclosure to promote easy boating. This object is at least in part obtained by a control unit for controlling a marine vessel to avoid an undesired situation.

The control unit comprises processing circuitry and a storage medium. The control unit is configured to receive path data from one or more sensor devices indicative of a path traveled by the marine vessel in a forward direction and store the received path data by the storage medium. The control unit is configured to receive a trigger signal from an input device and, in response to the trigger signal, determine a location for turning the vessel around, navigating to the location, turning the vessel around at the location, and navigating the vessel along the path in reverse direction.

This way, a helmsman or other person may activate the assistance system in, e.g., a stressful situation, whereupon the vessel autonomously turns around and goes back the way it came. This path is likely to be free of underwater obstacles like reefs and shallows and may thus be safely traversed.

The control unit may be configured to navigate the vessel along the path in reverse direction by generating control commands for one or more out of a rudder, an engine, and/or a thruster.

According to some aspects, the input device is a manual input device operable from a position onboard the vessel. This manual input device may, e.g., be an easily accessible button, perhaps located next to a steering wheel of the vessel, which can be pushed as soon as something happens which necessitates aborting a current maneuver by the vessel, such as a docking operation or the like. The input device may also be a portable device configured to be wirelessly connected to the control unit, such as a remote control device or even a smartphone device or the like. This portable device is optionally configured attachable to a jacket, life-vest, or other personal equipment.

According to other aspects, the control unit is configured to navigate the vessel along the path in the reverse direction up to a location associated with a man-overboard (MOB) event. Thus, if a person falls overboard, the situation avoidance system can be triggered in order to autonomously navigate the vessel back to the location of the MOB event, along the path traveled by the vessel after the MOB event occurred. Advantageously, the triggering of the autonomous navigation system does not require any particular boating skills, which means that anyone can trigger the system, even if they lack boating experience. The system can also be triggered remotely by a person having fallen overboard, which is an advantage, especially if the person overboard was the only person on the vessel to start with.

Optionally, the control unit is configured to initially bring the vessel to a halt in response to the trigger signal. The system may then be paused, waiting for a second trigger signal which functions like a confirmation signal to start the situation avoidance maneuver, i.e., to start maneuvering back along the path.

According to other aspects, the control unit is configured to reverse the vessel following bringing the vessel to a halt in response to the trigger signal. Reversing may be preferred in some scenarios where it is difficult to turn the boat around, and where going forward is not a good option.

According to some aspects, the marine vessel is a sailing vessel. In this case the control unit may be configured to turn into the wind and trigger a function for dowsing one or more sails in response to the trigger signal. This feature may be advantageously combined with the feature of bringing the vessel to a halt for a pre-determined amount of time.

The system may operate based on a number of different types of sensor data, or on combinations of different types of sensor data, such as global positioning system (GPS) data, data from a radar sensor and/or from a lidar sensor and/or from a vision-based sensor such as a camera or infra-red vision sensor. Using combinations of different types of sensor data increases system robustness. At the same time, it is an advantage that the system can function based only on one type of sensor data.

According to further aspects, the control unit is configured to receive obstacle data indicative of an obstacle in the vicinity of the path and adjust navigation of the vessel along the path to avoid the obstacle. This way, moving objects can be accounted for, and maneuvers may be performed to avoid collisions with such objects. These moving objects primarily comprise other marine vessels, but drifting passive objects may also appear, which it is desired to avoid. The obstacle data may comprise any of radar sensor data, lidar sensor data, vision-based sensor data, and/or automatic identification system (AIS) data.

The control unit may further be configured to receive weather data indicative of a wind condition along the path from a wind sensor and adjust the navigation along the path independent of the wind data. For instance, it may be desirable to maintain a windward position slightly offset from the traveled path in order to improve maneuvering margin with respect to, e.g., underwater obstacles and the like.

The disclosed systems may also be combined with automated systems for anchoring. Thus, according to some aspects, the control unit is configured to determine a suitable location for anchoring in a vicinity of the path, and after navigating the vessel along the path in reverse direction, to automatically deploy an anchor at the determined suitable location for anchoring, or to automatically activate a virtual anchoring function, where the control unit is configured to keep the determined suitable location by controlling a driveline of the marine vessel.

The location for anchoring may advantageously be determined in dependence of the anchoring capabilities of the vessel.

There are also disclosed herein marine vessels such as powerboats and sailboats, methods, computer programs, computer-readable media, and computer program products associated with the above-discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1A:
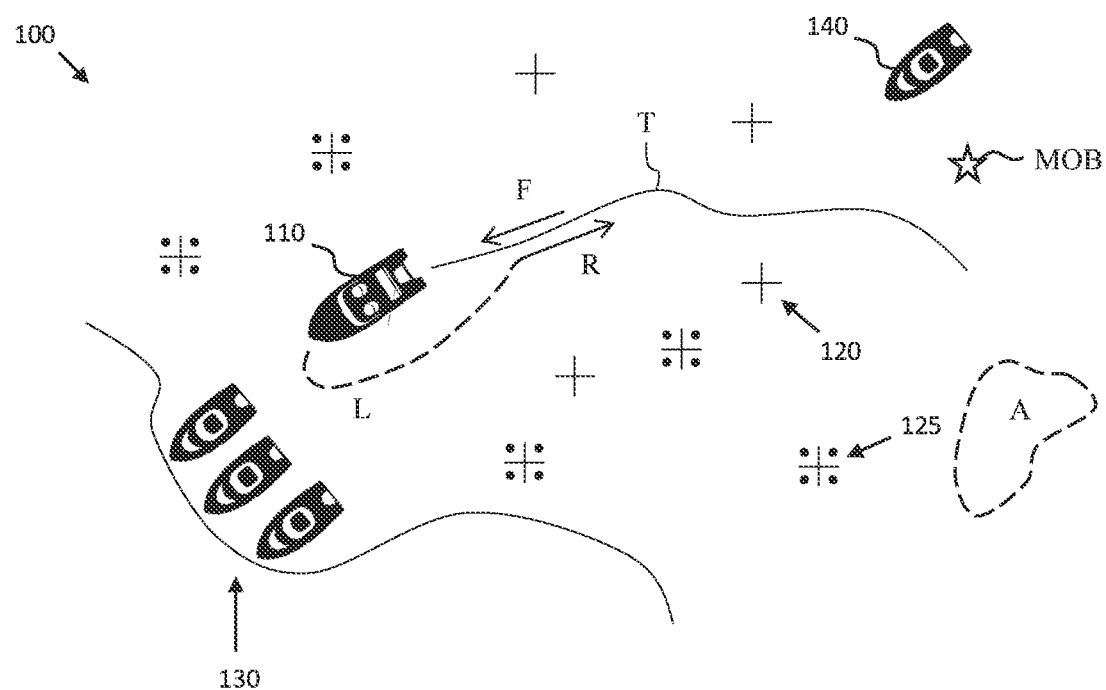
FIGS. 1A-B schematically illustrate marine vessels in example scenarios.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1A illustrates an example scenario 100 where a marine vessel 110, here a powerboat, is entering a natural harbor area 130, such as a cove. The navigation into the natural harbor is challenging due to the presence of obstacles such as shoals and reefs, i.e., underwater obstacles 120, 125. There are also other boats 140 nearby which are to be avoided. More often than not, unexpected things happen which necessitates aborting the maneuver and navigating back out from the area. For instance, it may turn out that the place is already full of other boats, something on the own boat may break, or the helmsman may for some reason not be able to complete the maneuver. This type of situation may be challenging, especially to less experienced persons.

Figure 1B:
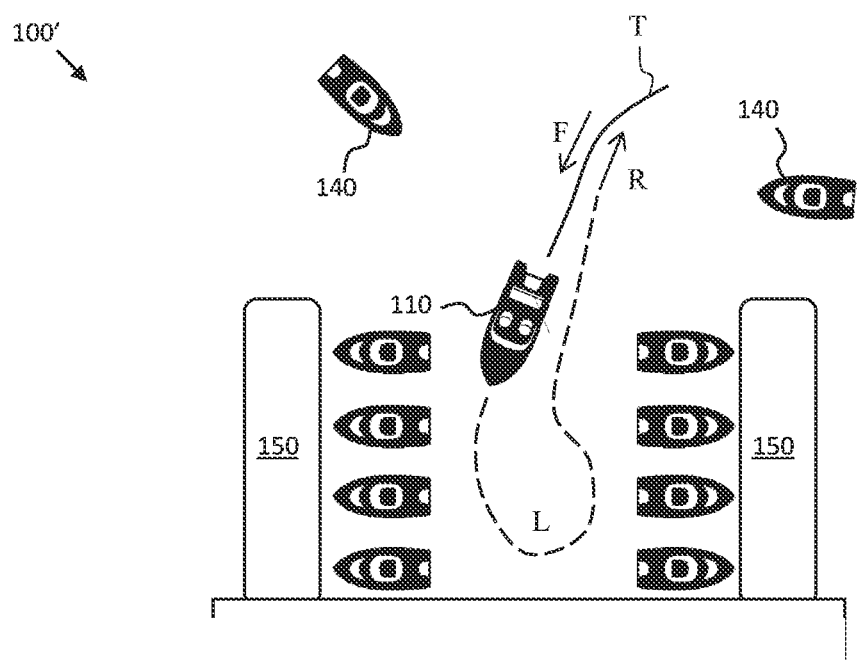

FIG. 1B illustrates another example scenario 100' where the marine vessel 110 is instead entering a harbor area with wharfs 150. When entering the area, it turns out that there is no space left for docking, which means that the helmsman needs to safely bring the boat out from a confined area.

The present disclosure relates to autonomous situation avoidance systems for marine vessels which are configured to assist a helmsman in these types of situations. Whenever the helmsman or someone else on board the vessel 110 determines that the current maneuver needs to be aborted, that person may generate a trigger signal. This trigger signal can, e.g., be generated by pressing a dedicated button, by activating a function via a control interface, or by a wireless device such as a dedicated radio remote control or a smartphone. The assistance system will then, in response to the trigger signal, determine a location L for turning the vessel 110 around, navigate to the location L, turn the vessel around at the location L, and then navigate the vessel 110 in a reverse direction R along the path T which the vessel followed in forward direction F when entering the area.

WO 2014/185828 A1 describes a system for assisting reversal of an articulated vehicle, such as a truck with a trailer. This reverse assist system records a predefined number of positions along a track which the vehicle follows in a forward direction. The driver may then be assisted by the system when reversing the vehicle along the same track. The positions may, e.g., be recorded using a global positioning system (GPS). The situation avoidance systems disclosed herein operate based on a similar principle. A control unit continuously records track data as the vessel 110 travels in the forward direction. This track data can then be used to navigate the vessel 110 in the reverse direction to follow the path taken into the area. Global positioning system (GPS) data normally forms the base for the stored track. However, this data may sometimes be associated with large errors, e.g., due to a limited view of the sky or due to multipath reflections of the GPS signals received from the GPS satellites. The systems disclosed herein therefore optionally relies on additional track data sources, such as radar systems, lidar system, and/or vision-based sensor systems.

The rationale for navigating back along the same track followed when entering into the situation is that this track is very likely to be free from underwater obstacles like reefs and shoals, since none were hit in the forward direction, and thus represents a feasible route away from the entered area.

It is appreciated that obstacles, such as other boats 140, may appear along the track T when navigating in reverse direction R. These boats 140 are, of course, to be avoided, if possible, during the navigation in reverse direction. Methods comprising optional features for avoiding such obstacles will be discussed below.

Figure 2:
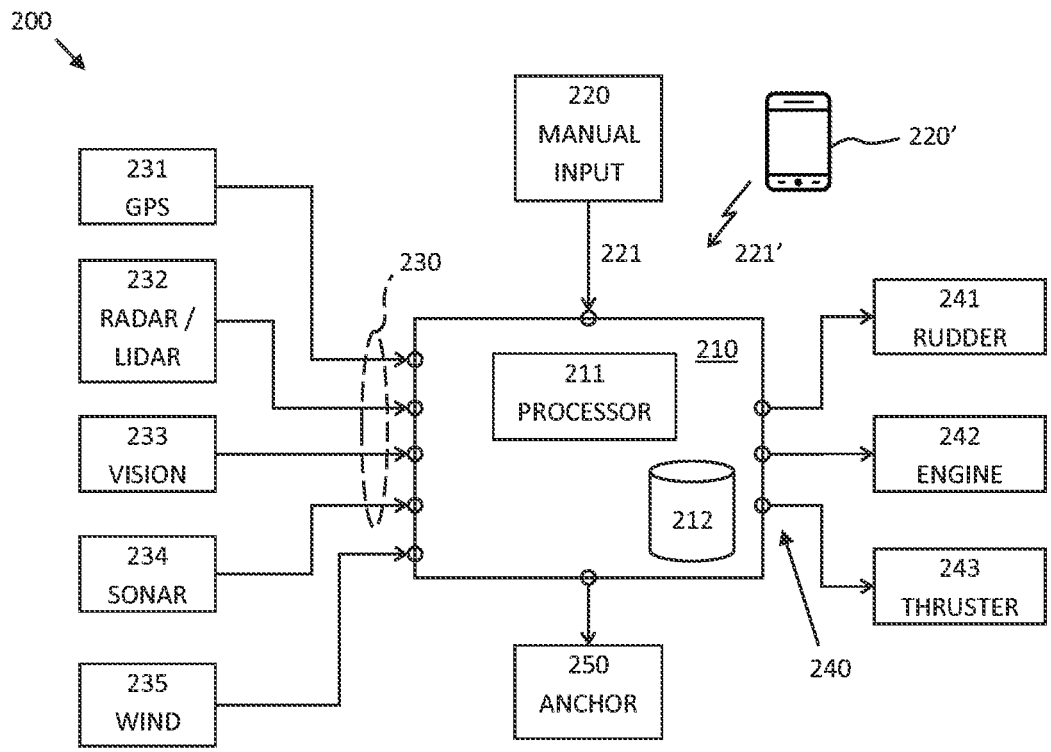
FIG. 2 schematically illustrates a control system.

FIG. 2 schematically illustrates a control system 200 for performing the type of situation avoidance maneuvers discussed above. The system comprises a control unit 210 for controlling a marine vessel 110 to avoid an undesired situation. The control unit 210 comprises processing circuitry 211 and a storage medium 212. The control unit 210 is configured to receive path data 230 from one or more sensor devices 231, 232, 233, 234, indicative of a path T travelled by the marine vessel 110 in a forward direction F and to store the received path data by the storage medium 212. The control unit 210 is configured to receive a trigger signal 221, 221' from an input device 220, 220', and, in response to the trigger signal 221, 221', determine a location L for turning the vessel 110 around, navigating to the location L, turning the vessel around at the location L, and navigating the vessel 110 along the path T in reverse direction R.

The received path data may just comprise a sequence of position fixes obtained from a GPS sensor 231, possibly comprising heading and speed data. Navigating the vessel 110 along the path T in reverse direction R then comprises steering the vessel using the position fixes as waypoints in a straight-forward manner. However, additional path data may be used instead of or in combination with the GPS data to increase system accuracy and robustness. In fact, some scenarios may require more accurate path data than that provided by a satellite navigation system like GPS. Such data may optionally be obtained from a radar sensor 232 and/or a lidar sensor which provides information related to objects in the vicinity of the path T, from a vision-based sensor 233 such as camera, stereo-camera, or infra-red vision sensor, which generates visual data, or from a sonar sensor 234, which generates a profile of the seabed over which the vessel 110 has traveled. These different data types and their use in navigating along the path T in reverse direction will be discussed in more detail below.

It is appreciated that the path traveled by the vessel from the place of activation of the trigger signal to the location L is comprised in the path T to be navigated along in the reverse direction R.

Optionally, the control unit 210 is configured to initially bring the vessel 210 to a halt in response to the trigger signal 221, 221', prior to navigating to the location L. The time duration of the initial halting of the vessel may be configurable or predetermined. For instance, the system may be configured to bring the vessel 110 to a halt in response to a first trigger signal, and then await a second trigger signal before navigating to the location L, turning the vessel around at the location L, and navigating the vessel 110 along the path T in reverse direction R. This second trigger signal would then have a function similar to that of a confirmation signal.

The distance to travel in the reverse direction may be associated with a preconfigured maximum distance, after which the vessel is brought to a halt. The navigation function may, of course, be terminated by an operator at any time, at which time manual control can be assumed again.

The input device may be a manual input device 220 operable from a position on-board the vessel 210. This input device may for instance be realized as a simple to reach button similar to a man-over-board (MOB) alarm button found on some vessels. The input device may also be realized as a menu choice in an existing navigation system interface on the vessel. For instance, the vessel 110 may comprise a display located in connection to the controls of the vessel for displaying, e.g., sea charts, radar images, and the like. This display may comprise a touch-screen function or other input device for triggering the situation avoidance maneuver.

The input device can also be a portable device 220' configured to be wirelessly connected to the control unit 210. This portable device 220' may be realized as a relatively simple remote control device that transmits a radio signal to a radio receiver configured on the vessel. The portable device 220' may also be a smartphone or other device that connects to the control unit 210 via a wireless link, such as a Wi-Fi link in the family of wireless network protocols based on the IEEE 802.11 family of standards, a Bluetooth wireless link, or the like.

According to some aspects, the control unit 210 is configured to navigate the vessel 110 along the path T in the reverse direction R up to a location associated with a man-overboard (MOB) event. This MOB event may, for instance, be associated with a fixed geographical position determined when a MOB alarm function was triggered. For instance, a person on board the vessel 110, or even the person who has fallen into the water, may trigger a MOB alarm function of the vessel, which in turn results in a fixed geographical position associated with the MOB event. The person in the water, or a person still on board the vessel 110, may then activate the situation avoidance maneuver to turn the boat around and navigate along the path T in reverse direction to the MOB event location, where, hopefully, the person in the water can be rescued.

In case the vessel is a sailing boat, the control unit 210 may optionally be configured to turn the vessel into the wind, dowse sails, start engines, and then navigate back to a person in the water or generally navigate away from an undesired situation. Thus, according to some aspects, the control unit 210 is configured to turn the vessel 110 into the wind and trigger a function for dowsing one or more sails in response to the trigger signal 221, 221'. The wind direction (into which to turn) may be obtained from a wind sensor 235 in a known manner.

Notably, the person in the water may have triggered this situation avoidance maneuver wirelessly from the position in the water. The portable device 220' is optionally configured attachable to a jacket, life-vest or other personal equipment for situations such as this. Thus, a person having fallen into the water is able to halt the vessel and trigger the vessel to return to the position of the person in the water. This is particularly advantageous if the person falling into the water is the only person on board the vessel, or the only person capable of maneuvering the vessel back to the MOB location. According to some aspects, the trigger signal is automatically generated when a dead man's switch is activated.

Some scenarios comprise very little space for maneuvering the vessel. For instance, in the scenario 100' illustrated in FIG. 1B, the space between the wharves 150 may not permit turning the vessel around. In such scenarios, the vessel may need to be reversed initially to a location where the vessel can be turned around. Of course, the space required to turn a vessel around varies from vessel to vessel. Some vessels are equipped with thrusters that permit turning the vessel around on the spot, while other vessels only comprise a propeller aft on the vessel and therefore require more space for turning the vessel around. Thus, according to some aspects, the control unit 210 is configured to reverse the vessel 110 following bringing the vessel to a halt in response to the trigger signal 221, 221'. The space required to turn the vessel around may be preconfigured or determined on a scenario-to-scenario basis, e.g., on data from a wind sensor 235. If the control unit 210 is not able to fit the space required for turning into the current location of the vessel based on, e.g., sea chart data or radar sensor data, the control unit may reverse the vessel a distance to a location where there is enough space for turning the vessel around. Alternatively, the control unit 210 may determine that there is enough room for turning the vessel around if the vessel is navigated some distance forward.

According to some aspects, the control unit 210 determines a set of candidate locations L for turning the boat around by identifying locations on a sea chart or map which are associated with the pre-determined required space for turning the boat around. The predetermined space for turning the boat around may, e.g., be defined by a circle of a given radius. The radius is optionally determined as a function of current weather conditions. For instance, if the wind is strong, then a larger circle may be selected compared to if the wind is not very strong, optionally based on a predetermined look-up table. Also, if the current scenario includes large waves, then a larger space for turning the boat around may be required. One example of identifying locations on a sea chart or map which are associated with the predetermined required space for turning the boat around is to move a circle having a predetermined radius over the sea chart or map in the vicinity of the vessels current location and detect places on the sea chart or map where no obstacles are comprised in the circle. These locations then constitute candidate locations for turning the boat around. The best such candidate can then be selected, e.g., as the candidate closest to the current location or the candidate deemed most easily reached, e.g., by a minimum of control maneuvers. The locations of other vessels 140 can also be considered when determining the location L for turning the vessel 110 around.

Generally, a cost function can be formulated based on various metrics for selecting the best candidate location for turning the vessel 110 around. This cost function may take the form of $$C_i = \sum_{k=1}^{N} w_k c_k$$

where $C_i$ is the total cost associated with the i-th candidate location $L_i$. The cost function comprises N different metrics. Each metric is associated with a predetermined weight $w_k$ indicating how important the metric is in relation to other metrics and a respective metric cost function $c_k$. For instance, one metric may be associated with the distance from the current location of the vessel to the candidate location for turning the vessel around. A candidate location far away from the current location of the vessel is then assigned a larger metric cost compared to a location closer to the current location of the vessel. Another metric may be associated with the number of other vessels within some predetermined distance of the candidate location, the more vessels the higher the cost of that particular candidate location. A third metric may be associated with the number of turns which have to be executed in order to reach the candidate location, where a more straight path to the candidate location is preferred over a location which requires many maneuvers around obstacles in order to reach. A fourth metric may be related to the free space of the candidate location, such that a small sized space for turning the vessel around (even if sufficient to turn the boat around) is associated with larger cost compared to a location with a free space well beyond the requirement.

The control systems disclosed herein may be based solely on one type of sensor data indicative of the path T travelled by the marine vessel 110 in the forward direction F, or on more than one type of data. Normally, the path data comprises GPS data, however, reverse path following may also be performed based on other types of sensor data.

For instance, the sensor data can be obtained from a rearward looking sensor recording a vision-based image sequence of the travelled path or a radar image sequence of the travelled path seen when looking out from the rear of the vessel. This recorded image sequence can then be used in combination with a corresponding forward looking sensor to navigate along the path T in reverse direction R with high accuracy. This is because, to navigate along the same path in reverse direction, the recorded image sequence should at least approximately match the sensor data from the forward looking sensor as the path is followed. Any deviation from the path will result in a mismatch between the image data recorded by the rearward looking sensor when travelling in forward direction and the image data recorded by the forward looking sensor when travelling in the reverse direction. Thus, by matching image sequences the vessel can be navigated along the path in reverse direction.

It is noted that some sensors are capable of a 360 degree view from the vessel, such as some omni-directional radar sensors. This sensor data need only be rotated 180 degrees in order to allow navigating back along the path T in the reverse direction R.

A bearing and distance to some landmark, obtained from a radar sensor or from a lidar sensor, is in fact sufficient to determine the path T. By loading such a sequence of bearings and distances from memory, reversing the sequence in time, and then controlling the vessel to obtain a sequence which is equal to, or at least similar to, the bearing and distance data stored in the forward direction, the same path will be followed in reverse direction.

If more than one type of sensor data is used jointly to navigate along the path T in reverse direction, then the different types of data may be weighted in relation to the accuracy in the data.

Figure 3:
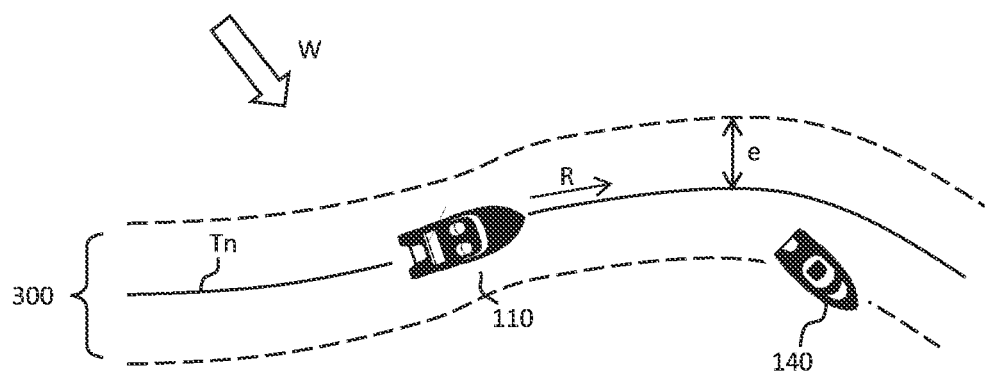
FIG. 3 shows a vessel navigating along a track.

As shown in FIGS. 1A and 1B above, moving obstacles, such as other marine vessels 140 and perhaps also drifting passive objects, may be present in the vicinity of the traveled path T. Some optional variants of the autonomous assistance systems disclosed herein are configured to detect and to avoid such objects when navigating along the path T in the reverse direction R. Thus, according to some aspects, the control unit is configured to receive obstacle data indicative of an obstacle 140 in the vicinity of the path T, and to adjust navigation of the vessel 110 along the path T to avoid the obstacle 140. The obstacle data indicative of an obstacle 140 in the vicinity of the path T may, e.g., comprise any of radar sensor detection data, lidar sensor detection data, vision-based sensor data, and/or automatic identification system (AIS) data. Adjusting navigation of the vessel 110 along the path T may, e.g., include adjusting boat speed to avoid collision (or even halting the vessel entirely for some time) while the other vessel crosses the path T, or performing minor evasive maneuvering. For instance, the track to be followed in the reverse direction may be defined by a nominal track Tn and a maximum track error e, as illustrated in FIG. 3. The control unit 210 is then allowed to adjust vessel heading to avoid collision with an obstacle 140 as long as the distance from the vessel 110 to the nominal track Tn is below the predetermined maximum track error e.

The control unit 210 may also be configured to receive weather data indicative of a wind condition along the path T from a wind sensor 234, and to adjust the navigation along the path T independent of the wind data. For instance, with reference to FIG. 3, in case of very strong winds from a given direction W, it may be desirable to maintain a windward position in relation to the nominal track Tn, i.e., to navigate along the track at an offset towards the wind, while keeping within the 'corridor' 300 defined by the nominal track Tn and the maximum error e.

With reference again to FIG. 2, the control unit may have one or more actuators at its disposal for controlling the vessel 110. Most vessels will comprise a rudder 241 for turning the vessel, and an engine 242 for powering the vessel. However, some vessels also comprise thrusters which may improve the maneuverability of the vessel, especially in tight spaces where there is not very much room for maneuvering. According to some aspects, the control unit 210 is configured to navigate the vessel 110 along the path T in reverse direction R by generating control commands for one or more out of a rudder 241, an engine 242 and/or a thruster 243.

Some vessels may also comprise anchoring systems 250 which can be triggered from the control unit 210. Such anchoring systems may be triggered at a location determined suitable for anchoring by the control unit 210. This may be a configurable option that can be selected by a user of the system when triggering the situation avoidance maneuver. According to such options, the control unit 210 is configured to determine a suitable location for anchoring A in the vicinity of the path T and deploying an anchor 250 at the suitable location for anchoring A. The suitable location for anchoring may be determined based on a set of preconfigured anchoring capabilities of the vessel 110. For instance, a requirement may be placed on maximum depth and possibly also seabed properties. A suitable location for anchoring is associated with a minimum required free space. It is appreciated that this minimum required free space may be configured independent of the type of vessel and optionally also independent of the anchoring depth at the location A. According to an example, a suitable location for anchoring may be determined by searching for a location on a sea chart with a depth smaller than the maximum depth for anchoring and having an area above the minimum required area configured for the vessel when anchoring at the depth of the location.

The anchoring system 250 can instead be a virtual anchoring function, where the control unit is configured to keep the suitable position by controlling the driveline. Thus, a virtual anchoring system is independent of the sea depth or seabed properties.

Figure 4:
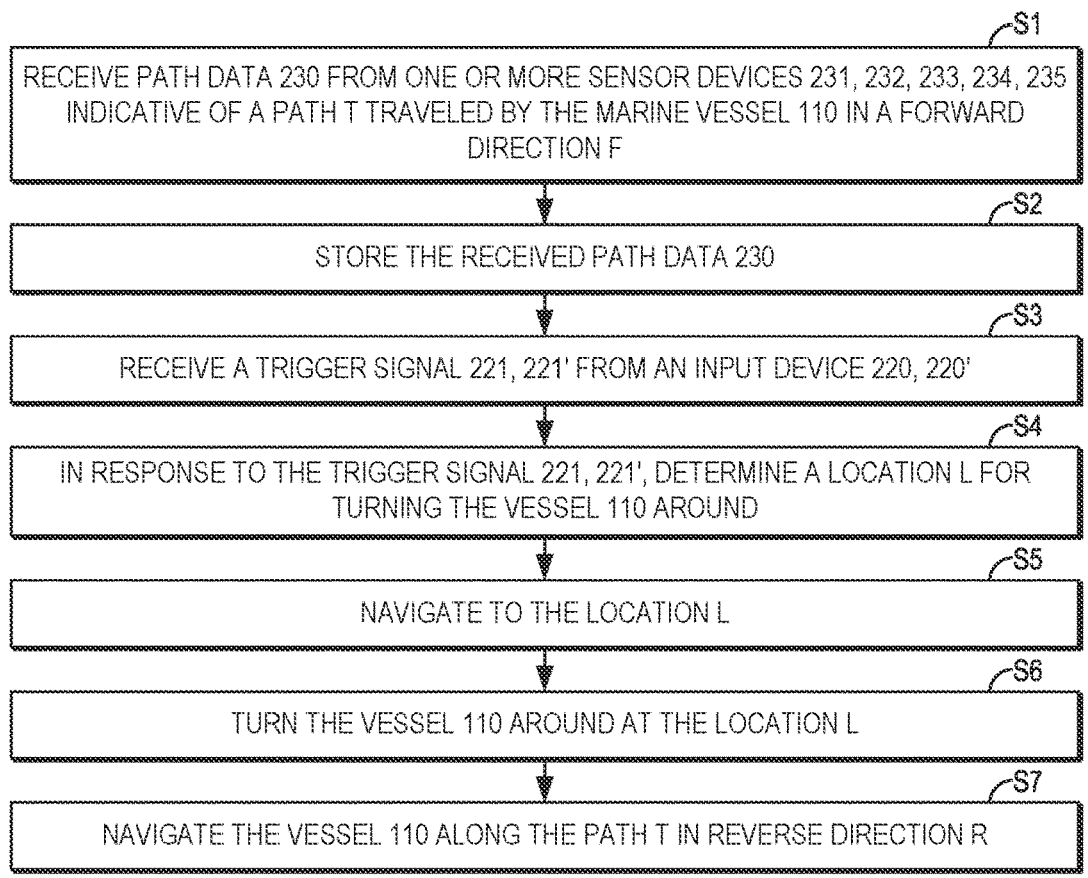
FIG. 4 is a flow chart illustrating methods.

FIG. 4 is a flow chart which summarizes the methods discussed above. There is shown a method for controlling a marine vessel 110 to avoid an emergency situation. The method comprises receiving S1 path data 230 from one or more sensor devices 231, 232, 233, 234, 235 indicative of a path T traveled by the marine vessel 110 in a forward direction F, storing S2 the received path data, receiving S3 a trigger signal 221, 221' from an input device 220, 220', and, in response to the trigger signal 221, 221', determining S4 a location L for turning the vessel 110 around, navigating to the location S5, turning S6 the vessel around at the location L, and navigating S7 the vessel 110 along the path T in reverse direction R.

Figure 5:
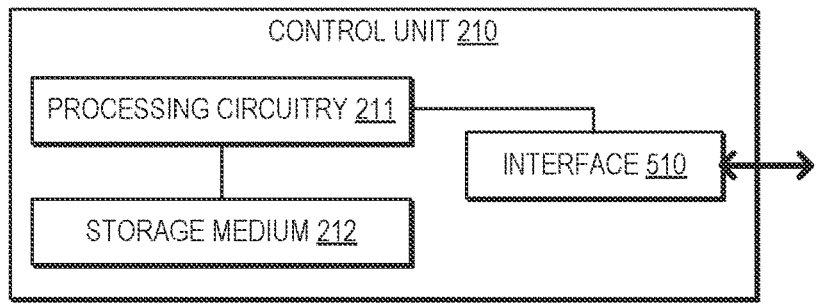
FIG. 5 schematically illustrates a control unit.

FIG. 5 schematically illustrates, in terms of a number of functional units, the components of a control unit 210 according to embodiments of the discussions herein. This control unit 210 is configured to execute at least some of the functions discussed above for control of a marine vessel 110. Processing circuitry 211 is provided using any combination of one or more of a suitable central processing unit CPU, multiprocessor, microcontroller, digital signal processor DSP, etc., capable of executing software instructions stored in a computer program product, e.g., in the form of a storage medium 212. The processing circuitry 211 may further be provided as at least one application-specific integrated circuit (ASIC) or field-programmable gate array (FPGA).

Particularly, the processing circuitry 211 is configured to cause the control unit 210 to perform a set of operations, or steps, such as the methods discussed in connection to FIG. 4. For example, the storage medium 212 may store the set of operations, and the processing circuitry 211 may be configured to retrieve the set of operations from the storage medium 212 to cause the control unit 210 to perform the set of operations. The set of operations may be provided as a set of executable instructions. Thus, the processing circuitry 211 is thereby configured to execute methods as herein disclosed.

The storage medium 212 may also comprise persistent storage, which, for example, can be any single one or combination of magnetic memory, optical memory, solid state memory or even remotely mounted memory.

The control unit 210 may further comprise an interface 510 for communications with at least one external device as discussed in connection to FIG. 2 above. As such the interface 510 may comprise one or more transmitters and receivers, comprising analog and digital components and a suitable number of ports for wireline or wireless communication.

The processing circuitry 211 controls the general operation of the control unit 210, e.g., by sending data and control signals to the interface 510 and the storage medium 212, by receiving data and reports from the interface 510, and by retrieving data and instructions from the storage medium 212. Other components, as well as the related functionality, of the control node, are omitted in order not to obscure the concepts presented herein.

Figure 6:
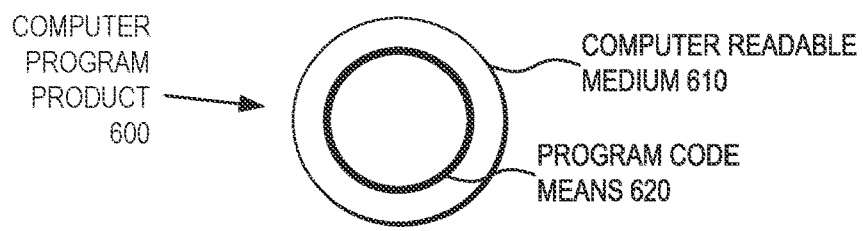
FIG. 6 shows an example computer program product.

FIG. 6 illustrates a computer-readable medium 610 carrying a computer program comprising program code means 620 for performing the methods illustrated in FIG. 4, when said program product is run on a computer. The computer-readable medium and the code means may together form a computer program product 600.

The invention claimed is:

1. A control unit for controlling a marine vessel to avoid an undesired situation, the control unit comprising:
   processing circuitry; and
   a storage medium,
      wherein the control unit is configured to receive path data from one or more sensor devices indicative of a path traveled by the marine vessel in a forward direction and to store the received path data by the storage medium,
      wherein the control unit is configured to receive a trigger signal from an input device, and, in response to the trigger signal, autonomously navigate the marine vessel by being configured to determine a location for turning the marine vessel around, navigate to the location, turn the marine vessel around at the location, and navigate the marine vessel along the path in reverse direction; and wherein the control unit is configured to determine the location for turning the marine vessel around by being configured to:
determine one or more candidate locations;
calculate, for the one or more candidate locations, corresponding one or more costs, each based on one or more metrics and corresponding one or more weights; and
select the location from among the one or more candidate locations based on the one or more costs.

2. The control unit of claim 1, wherein the input device is a manual input device operable from a position onboard the marine vessel.

3. The control unit of claim 1, wherein the input device is a portable device configured to be wirelessly connected to the control unit.

4. The control unit of claim 3, wherein the portable device is configured attachable to a jacket, life-vest, or other personal equipment.

5. The control unit of claim 1, wherein the control unit is configured to navigate the marine vessel along the path in the reverse direction up to a location associated with a man-overboard (MOB) event.

6. The control unit of claim 1, wherein the control unit is configured to initially bring the marine vessel to a halt in response to the trigger signal.

7. The control unit of claim 6, wherein the control unit is configured to reverse the marine vessel following bringing the marine vessel to a halt in response to the trigger signal.

8. The control unit of claim 1, wherein the marine vessel is a sailing vessel, and wherein the control unit is configured to turn into the wind and trigger a function for dowsing one or more sails in response to the trigger signal.

9. The control unit of claim 1, wherein the path data comprises global positioning system (GPS) data.

10. The control unit of claim 1, wherein the path data comprises data from a radar and/or lidar sensor and/or from a vision-based sensor.

11. The control unit of claim 1, wherein the control unit is configured to receive obstacle data indicative of an obstacle in a vicinity of the path and to adjust navigation of the marine vessel along the path to avoid the obstacle.

12. The control unit of claim 11, wherein the obstacle data comprises any of radar sensor data, lidar sensor data, vision-based sensor data, and/or automatic identification system (AIS) data.

13. The control unit of claim 1, further configured to receive weather data indicative of a wind condition along the path from a wind sensor and to adjust the navigation along the path independent of the wind data.

14. The control unit of claim 1, further configured to navigate the marine vessel along the path in reverse direction by generating control commands for one or more out of a rudder, an engine, and/or a thruster.

15. The control unit of claim 1, further configured to determine a suitable location for anchoring in a vicinity of the path, and after navigating the marine vessel along the path in reverse direction;
to automatically deploy an anchor at the determined suitable location for anchoring, or
to automatically activate a virtual anchoring function, wherein the control unit is configured to keep the determined suitable location by controlling a driveline of the marine vessel.

16. A marine vessel comprising a control unit for controlling the marine vessel to avoid an undesired situation, the control unit comprising processing circuitry and a storage medium, wherein the control unit is configured to receive path data from one or more sensor devices indicative of a path traveled by the marine vessel in a forward direction and to store the received path data by the storage medium, wherein the control unit is configured to receive a trigger signal from an input device, and, in response to the trigger signal, autonomously navigate the marine vessel by being configured to determine a location for turning the marine vessel around, navigate to the location, turn the marine vessel around at the location, and navigate the marine vessel along the path in reverse direction;
wherein the control unit is configured to determine the location for turning the marine vessel around by being configured to:
determine one or more candidate locations;
calculate, for the one or more candidate locations, corresponding one or more costs, each based on one or more metrics and corresponding one or more weights; and
select the location from among the one or more candidate locations based on the one or more costs.

17. A method for controlling a marine vessel to avoid an emergency situation, the method comprising:
receiving path data from one or more sensor devices indicative of a path traveled by the marine vessel in a forward direction,
storing the received path data,
receiving a trigger signal from an input device, and
in response to the trigger signal, autonomously navigating, by processing circuitry of a control unit, the marine vessel by determining a location for turning the marine vessel around, navigating to the location, turning the marine vessel around at the location, and navigating the marine vessel along the path in reverse direction;
wherein determining the location for turning the marine vessel around comprises:
determining one or more candidate locations;
calculating, for the one or more candidate locations, corresponding one or more costs, each based on one or more metrics and corresponding one or more weights; and
selecting the location from among the one or more candidate locations based on the one or more costs.

18. A non-transitory computer-readable medium having stored thereon a computer program that, when executed by processing circuitry of a control unit, causes the processing circuitry to:
receive path data from one or more sensor devices indicative of a path traveled by a marine vessel in a forward direction,
store the received path data,
receive a trigger signal from an input device, and
in response to the trigger signal, autonomously navigate the marine vessel by causing the processing circuitry to:
determine a location for turning the marine vessel around;
navigate to the location;
turn the marine vessel around at the location; and
navigate the marine vessel along the path in reverse direction;
wherein the computer program causes the processing circuitry to determine the location for turning the marine vessel around by causing the processing circuitry to:

determine one or more candidate locations;
calculate, for the one or more candidate locations, corresponding one or more costs, each based on one or more metrics and corresponding one or more weights; and
select the location from among the one or more candidate locations based on the one or more costs.

* * * * *